Jan. 30, 1951
O. E. ESVAL ET AL
2,539,411
AUTOMATIC PILOT
Filed Feb. 3, 1944
3 Sheets-Sheet 1
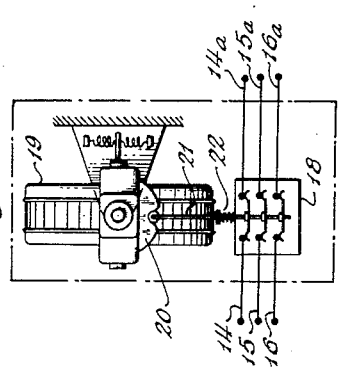
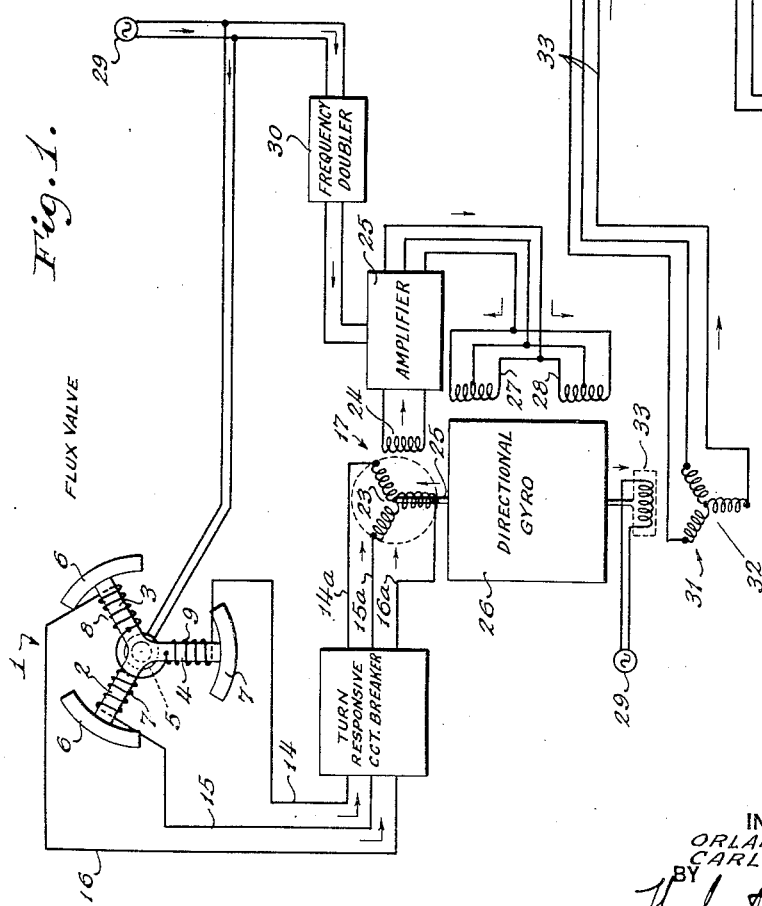
INVENTORS
ORLAND E. ESVAL
CARL A. FRISCHE
BY
Herbert V. Thompson
their ATTORNEY.

Jan. 30, 1951
O. E. ESVAL ET AL
2,539,411
AUTOMATIC PILOT
Filed Feb. 3, 1944
3 Sheets-Sheet 2
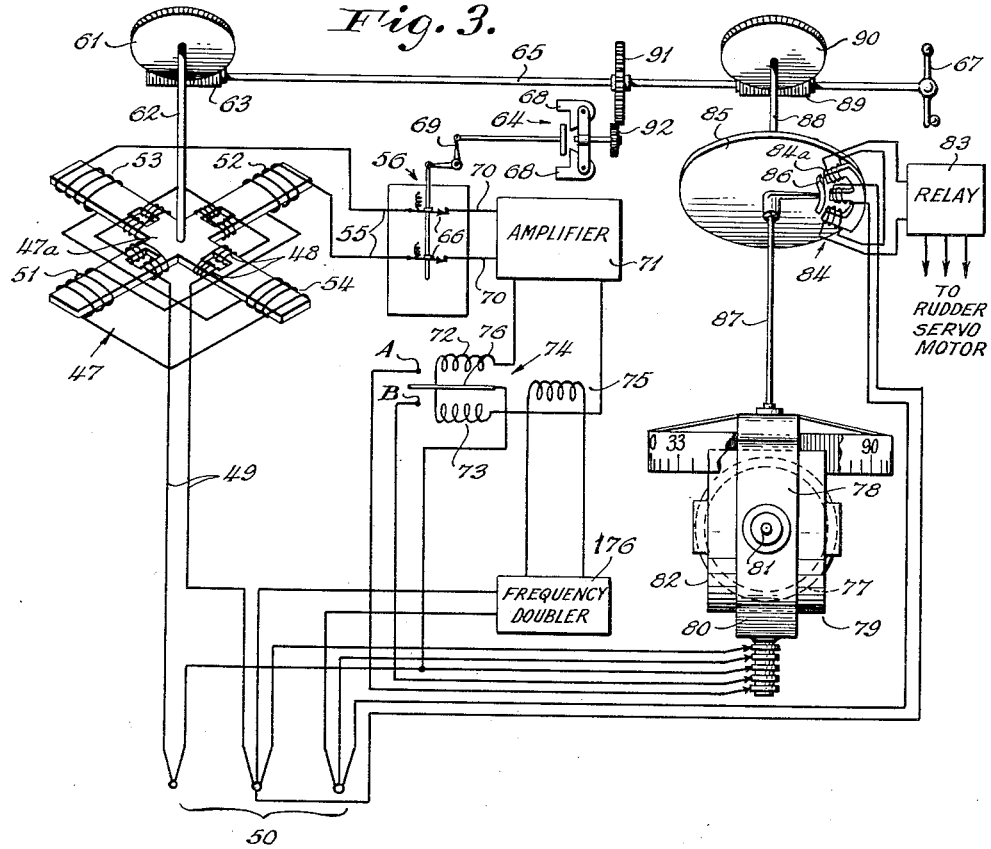
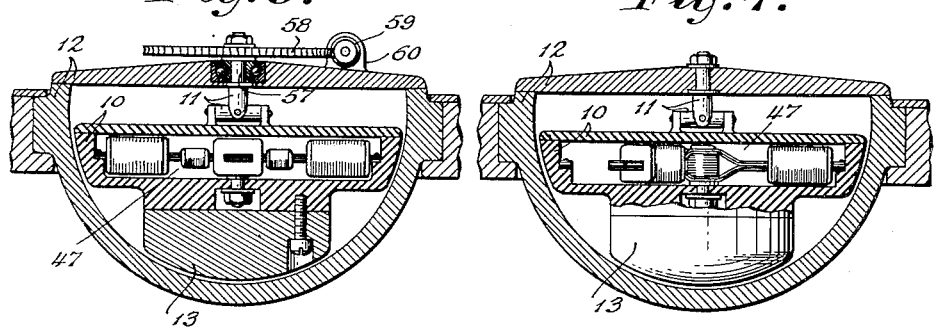
INVENTORS
ORLAND E. ESVAL
CARL A. FRISCHE
BY
Herbert H. Thompson
their ATTORNEY.

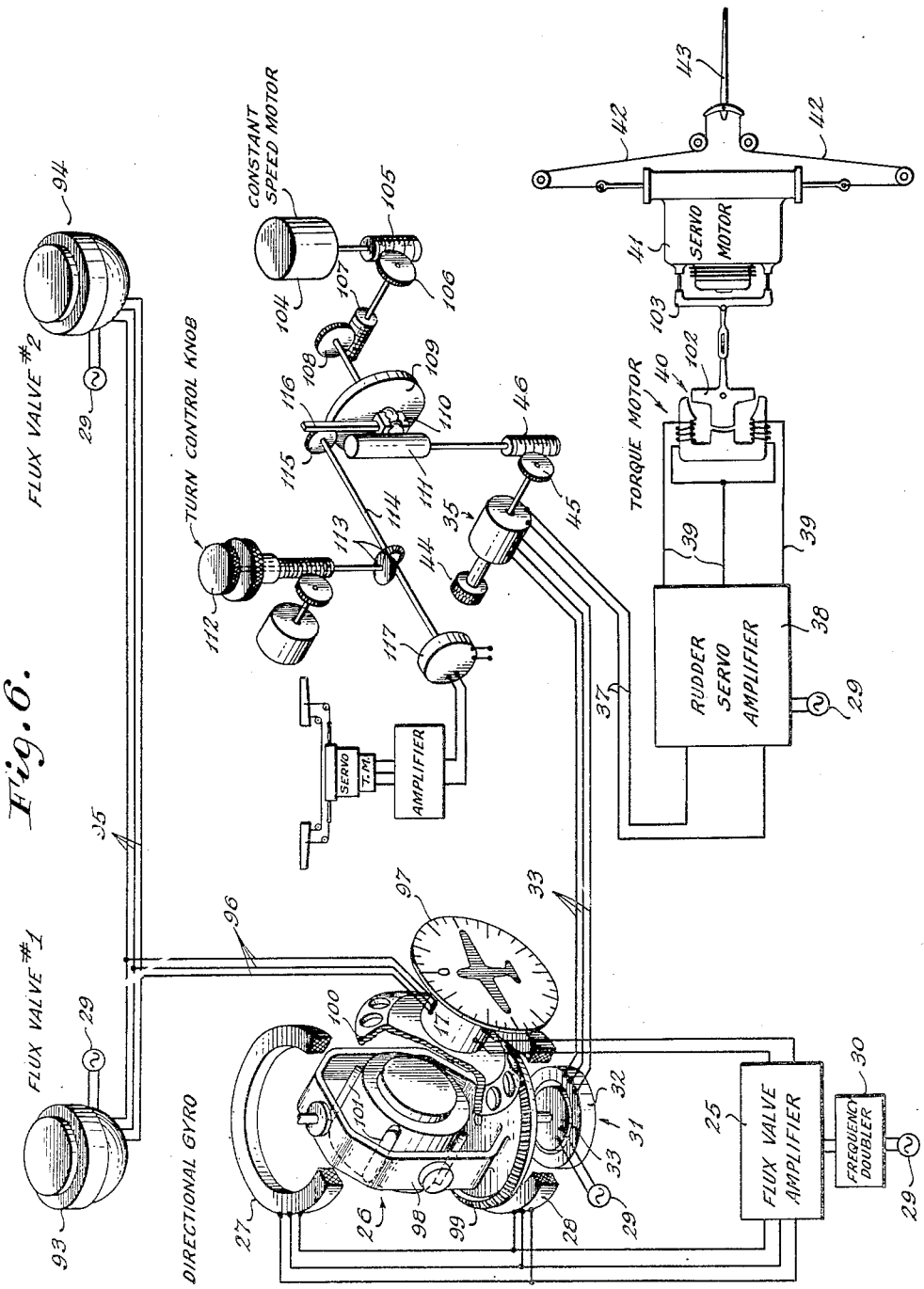

Patented Jan. 30, 1951

2,539,411

UNITED STATES PATENT OFFICE 2,539,411

AUTOMATIC PILOT

Orland E. Esval, Huntington, and Carl A. Frische, Great Neck, N. Y., assignors to The Sperry Corporation, a corporation of Delaware Application February 3, 1944, Serial No. 520,842

14 Claims. (Cl. 244—77)

Our invention more particularly relates to an automatic pilot for dirigible craft in which a directional gyroscope is employed to provide a directional reference in azimuth for craft-controlling purposes and in which a flux valve is employed to slave the gyro. The present application is a continuation-in-part of our copending application Serial No. 366,370, filed in the U. S. Patent Office on or about the 20th of November, 1940 and which matured into Patent No. 2,357,319.

It is an object of our invention to provide an automatic pilot for use primarily in controlling the course of a dirigible craft, which pilot comprises a directional gyro which is slaved by means of a flux valve of the character which continuously provides a signal voltage output, said signal voltages being employed to control the precessing means of the gyroscope in such a manner that the gyro will substantially continuously provide a correct, predetermined azimuthal directional reference, and said pilot including compensating means whereby turning movements of the flux valve with the craft will not effect precession of the gyro unless the gyro has wandered from its azimuthal position.

Another object of our invention resides in providing an automatic pilot for a dirigible craft comprising a directional gyro and a flux valve of the character having a null output position for slaving the gyro to a predetermined directional reference. In this type of pilot, wandering of the gyro will be reflected in a change in heading of the craft which will thereby move the flux valve to a signal output position causing precession of the gyro back to the position thereof from which it wandered. Hence, in a pilot of this character, the flux valve output may be connected directly in controlling relation to the gyro-precessing torque motor of the gyro.

Another object resides in providing an automatic pilot of the foregoing characters including means for removing the flux valve control over the gyro during turning movements of the valve whereby to prevent incorrect gyro-precession due to turning errors in the output of the valve.

With the foregoing and still other objects in view, which will be apparent from the following description of our invention, our invention includes the novel correlation and relative arrangement of elements described below and illustrated in the accompanying drawings, in which:

Fig. 1 schematically represents a preferred embodiment of our invention, including the wiring diagram of the electrical elements illustrated therein;

Fig. 2 is a somewhat schematic, detailed illustration of one of the elements preferably embodied in the circuit of Fig. 1;

Fig. 3 schematically represents a modified form of automatic pilot;

Fig. 4 is a fragmentary, sectional elevational view of a mounting for a flux valve of one type, the flux valve being shown supported therein;

Fig. 5 is a view similar to Fig. 3 showing a second type of flux valve supported in the mounting therefor and associated means for turning the flux valve in azimuth relative to the craft on which it is mounted; and Fig. 6 is a somewhat schematic illustration of an automatic pilot generally similar to that illustrated in Fig. 1, but somewhat modified and particularly showing the mechanical aspects of the pilot.

Preferably, in the present invention we employ a directional gyro which provides an azimuthal direction reference and means controlled by the position of the directional gyro for controlling the position of a control surface or the rudder of a dirigible craft. Since a gyro of the character herein employed does not continuously provide a predetermined directional reference but wanders therefrom, due to external forces acting thereon, we also employ a flux valve for slaving the gyro or causing it to return to a predetermined reference position if it should wander therefrom. Broadly speaking, flux valves may be considered of two types, one which continuously provides signal voltage outputs which are proportional in magnitude to the component of the earth's field lying along the legs thereof, while the other type is of such character that in one position thereof in the earth's field, no voltage output will be produced. The foregoing characteristics of these two types of valves must therefore be considered when utilized in an automatic pilot. When using the former type, wherein voltage outputs are derived therefrom for all positions thereof in azimuth in the earth's field and where the flux valve is mounted to move in azimuth with the craft, some means must be provided to compensate or correct for azimuthal movement of the flux valve when the directional gyro or its vertical ring remains stationary in space. When the latter type of ffux valve is employed, its zero voltage output position may be used as an azimuthal reference for the gyro, and the craft itself, through the operation of the automatic pilot, may serve to maintain the directional reference provided by the gyro in fixed angular relation in azimuth relative to the directional reference provided by the flux valve, Referring first to Fig. 1 wherein we have illustrated a preferred embodiment of our automatic pilot, it will be observed that therein we illustrate a flux valve of the first type above described or one which will provide signal voltage outputs for all azimuthal positions thereof in the earth's field. In Fig. 1 we have by way of example shown a three-legged flux valve, the core legs of which are radially arranged at equal angles to each other and are formed of permeable magnetic material. The flux valve indicated generally at 1 comprises the legs 2, 3 and 4, each of which is bifurcated at its inner end or at the geometric center of the valve as more clearly illustrated in Fig. 4. Each leg may comprise upper and lower laminations which extend in adjacent, superimposed relationship throughout the major lengths thereof, but are bent outwardly in opposite directions and thence over bent in spaced parallel relationship so that the respective laminations of each leg may be secured together at the center of the valve and to opposite ends of an exciting coil and its associated core. Respective laminations of the core legs may be integral. The outer ends of the core legs may be provided with flux collectors 6 or horns. Upon each leg is mounted a pick-up coil 7, 8 and 9 which may be Y-connected as shown to supply a plurality of output voltages in polyphase fashion.

As shown in Fig. 4, the flux valve is preferably pendulously mounted on the craft so as to maintain its average position horizontal. The flux valve is shown as enclosed in a liquidtight container 10, suspended on a universal connection 11 which, in turn, is supported in the top of the outer casing 12. The outer casing is adapted to be filled at least in part with a damping liquid such as oil and the flux valve and its enclosing casing 10 is rendered pendulous by a mass 13 secured to the bottom of container 10. Flexible wires may be employed to conduct current to the exciting coil of the flux valve and to connect the pick-up coils in which the signal voltages are generated with the circuit of the pilot. Container 10 and casing 12 are formed of non-magnetic preferably electrical insulating material.

While the average position of the pendulum will remain vertical during uniform flight in a straight line, maintaining the flux valve substantially horizontal, the pendulum will of course swing out on turns or under other acceleration forces and we prefer to disconnect the flux valve from the gyro or to break the connections therebetween during such turns for reasons hereinafter particularly pointed out. Hence, as shown in Fig. 1, the output conductors 14, 15 and 16 are connected to a turn responsive circuit breaker, the output conductors 14a, 15a and 16a of which are connected with the polyphase winding of a signal transformer indicated generally at 17.

The turn responsive circuit breaker may be of the character shown in Fig. 2 wherein a switch 18 serves normally to connect conductor 14, 15 and 16 with conductor 14a, 15a and 16a. A rate of turn or turn indicator type gyro 19 operates to open the switch 18 through the medium of the heart-shaped cam 20 and follower rod 21 which is normally biased to urge the switch 18 in circuit closing position by spring 22. Precession of the rate gyro in either direction about its axis will cause the cam to depress the follower rod 21 to thereby disconnect the output leads of the flux valve from the input leads to the signal transformer 17.

The leads 14a, 15a, and 16a, as hereinabove described, are connected with the three windings constituting the polyphase winding 23 of the signal transformer 17. A single phase winding 24 of the transformer 17 is connected to a suitable phase sensitive amplifier 25. The windings of the polyphase winding 23 of the transformer are arranged in relative angular relationship forming equal angles therebetween and therefore provide a resultant magnetic field having a direction corresponding to the direction of the earth's field. The winding 23, in the embodiment herein illustrated is connected to rotate with the vertical shaft 261 of the vertical ring of the directional gyro 26, while the winding 24 is relatively stationary or, in other words, fixed to move in azimuth with the craft. Of course, winding 24 could be mounted to rotate with the vertical ring of the gyro while the polyphase winding is mounted to move in azimuth with the craft. As long as the polyphase winding 23 occupies a certain relative angular position with respect to winding 24 as compared to the position of the pick-up coils 7, 8 and 9 of the flux valve in the earth's field no signal is generated in the winding 24, but upon relative displacement from the above assumed relative position between the winding 23 and the flux valve coils 7, 8 and 9, an A. C. signal will be generated of one or the opposite phase in the single phase winding 24 of transformer 17 depending upon the direction of such displacement. This signal is employed to cause precession of the directional gyro 26 to bring it into relative agreement with the directional reference provided by the flux valve. To this end, we have shown the signal from the winding 24 as led to a phase sensitive amplifier and thence to the precessing coils 27 and 28 of the directional gyro. For phase-sensing purposes, alternating current from the source 29 which is employed in exciting the flux valve is connected through a frequency doubler 30 and double-frequency energy is supplied to the amplifier as a reference frequency for phase-detection purposes. The necessity of employing a frequency doubler, which may be of any suitable type, is because the signal voltage outputs of the flux valve will be of a frequency equal to twice that of the exciting current as explained in the application of Lennox F. Beach, Serial No. 348,582, for Indicator for Magnetic Fields, filed July 30, 1940, and which matured into Patent No. 2,383,459. The precessing coils are so connected with the output of the amplifier that when a signal is supplied to the amplifier of one phase representing a wandering movement of the gyro in one direction, the coils will exert a torque causing the gyro to precess back to the position from which it has wandered while a signal of the opposite phase, supplied to amplifier 25, will cause the precessing coils to exert a torque in the opposite direction.

In the embodiment herein illustrated, a signal generator, indicated generally at 31, of the "Selsyn" type is employed as a pick-off at the gyro. The generator 31 includes relatively movable, polyphase and single phase windings indicated generally at 32 and 33, one of which is mounted to rotate with the craft in azimuth and the other of which is positioned by the vertical ring of the gyro. In Fig. 1, the single phase winding 33 is mounted to rotate with the vertical ring of the gyro and is excited from a suitable source of alternating current such as source 29. The polyphase winding, which is movable with the craft in azimuth, is connected through conductors 33 to the polyphase winding 34 of a second signal generator 35, and the single phase winding 36 of signal generator 35 is connected through conductors 37 to a suitable signal amplifier 38. The output of amplifier 38 is connected through conductors 39 to a torque motor 40 which serves to control a hydraulic servomotor 41, and the servomotor is operable through suitable connections such as the cables 42 herein illustrated to position a control surface or the rudder 43 of a dirigible craft.

The signal generator 35 may be employed for course-setting purposes or to control the rate of turn of the craft and in Fig. 1 we have illustrated it primarily as arranged for course-setting purposes whereas its connection for rate of turn control is shown to better advantage in Fig. 6. The course-setting knob 44 serves to position the polyphase winding 34 of the signal generator relative to the single phase winding 36 thereof and, as hereinafter described in connection with Fig. 6, gear 45 meshing with worm 46 which, in turn, is driven through a suitable variable speed drive from a constant speed motor, is connected to rotate the single phase winding 36 for rate of turn control purposes.

The operation of the embodiment of our present invention hereinabove described should be clearly evident from the following brief description thereof. As above indicated, the flux valve 1 is mounted upon and fixed to turn in azimuth with the craft. The directional gyro 26, however, may rotate about its vertical or azimuth axis relative to the craft as the craft turns and, of course, relative to the flux valve. Under these conditions, assuming that the craft turns in azimuth or maintains a given heading while the gyro provides a predetermined orientation or error-free directional reference, the gyro should be free from any precessing torque. However, unless some compensating means were provided, the turn of the flux valve with the craft in azimuth would institute the application of a precessing torque to the gyro due to the fact that the direction of the resultant field produced by the output voltages of the flux valve in the polyphase winding of the synchronous transformer 17 will change with azimuthal rotation of the flux valve and therefore a signal would be generated in the single phase winding 24 of the transformer. By relatively rotating the windings 23 and 24 of the synchronous transformer 17, in accordance with turning of the craft and flux valve in azimuth, the electrical relationship of the windings is preserved and does not vary when the flux valve only turns in azimuth, whereby no signal is supplied to cause operation of the gyro-precessing means or coils 27 and 28, and therefore compensation for azimuthal rotation of the flux valve, alone, is accomplished. In the embodiment illustrated, the polyphase winding 23 of the synchronous transformer moves in azimuth with the vertical ring of the gyro relative to winding 24 which moves only in azimuth with the flux valve and the craft. Hence, for all azimuthal movements of the flux valve, no operation of the gyro-precessing coils will be effected unless the gyro wanders or deviates from its predetermined position of orientation. In this latter event, the electrical relationship of the windings of the synchronous transformer will vary and the gyro will be caused to precess in a deviation-correcting direction.

From the foregoing it will be readily observed that the directional gyro 26 as so slaved by the flux valve 1 will provide an azimuthal reference for controlling the course or heading of the dirigible craft and the course or heading will not vary so long as the electrical relationship between the polyphase and single phase windings of the pick-off 31 and signal generator 35 is preserved. If the craft should deviate from the course established by the directional gyro, winding 32 of the pick-off 31 will rotate with the craft relative to the single phase winding 33 thereof which is positioned by the directional gyro thereby producing a signal of a phase sense depending upon the direction of relative rotation of the windings which is supplied through the signal generator 35 to the phase sensitive, rudder-servo amplifier causing the servo to actuate the rudder in a direction to restore the craft to its original heading. When it is desired to change course, the course-setting knob 44 may be rotated in one direction or the other thereby generating in the winding 36 thereof a signal voltage of one phase sense or the other depending on the direction of rotation of the polyphase winding relative thereto. This signal is supplied to the rudder servo amplifier causing the servo to operate the rudder in the direction and to a degree dependent upon the phase sense of the signal and the magnitude thereof. The signal, therefore, will cause the craft to turn until the polyphase winding 32 of the pick-off 31, which turns in azimuth with the craft, angularly shifts the direction of the resultant field of the polyphase winding of the signal generator 35 to the same angular extent as the course-setting knob 44 has been rotated. In other words, the craft in response to a signal generated by the signal generator 35 will turn through an angle corresponding to the relative angular movement effected by the course-setting knob between the windings 34 and 36 or until this signal is reduced to zero through the operation of the pick-off 31.

In the form of our invention disclosed in Fig. 3 we employ a flux valve of the second type hereinabove referred to or, in other words, a flux valve which is characterized by the fact that in one position thereof in azimuth it will provide zero voltage output. The flux valve indicated generally at 47 in Fig. 3 comprises a cruciform core 47a on the respective legs of which are mounted both exciting and pick-up windings. In the embodiment illustrated, each leg of the core is provided with a cut-out portion on opposite sides of which the exciting coils 48 are wound. These coils may be connected in series or parallel and connected through conductors 49 to a suitable source of alternating current such as one phase of a three-phase source 50. The pick-up coils 51, 52, 53 and 54 are mounted on the respective legs of the core, being connected in series and through conductors 55 to a circuit breaker 56.

Where the flux valve is employed as a component of an automatic pilot for use on aircraft, the flux valve 47 may be mounted as shown in Fig. 3, dependence being had on the automatic pilot to maintain the craft and the flux valve stable against roll and pitching. However, flux valve 47 may be mounted in pendulous fashion so as to maintain its average position horizontal as shown in Fig. 5. In Fig. 5, the flux valve 47 is enclosed in the liquid type container 10 of the character shown in Fig. 4 which is suspended on the universal connection 11 from shaft 57 which is rotatably supported in the top of the outer casing 12. Casing 12, as hereinbefore pointed out, may be filled with a damping liquid and flux valve and its casing 10 may be made pendulous by mass 13. Flexible wires are employed to conduct exciting current to the valve and to connect the pick-up coils thereof with the balance of the pilot system. In the event the flux valve is pendulously supported it may be rotated in azimuth about the axis of shaft 57 by means of gear 58 secured to shaft 57 and meshing with worm 59 which may be suitably supported in a bearing 60 on the top of the outer casing 12.

In Fig. 3 rotation of the flux valve 47 in azimuth is similarly accomplished through the medium of gear 61 and shaft 62, secured thereto and to the flux valve 47, and worm 63. In this embodiment of our invention the means for disconnecting the flux valve from the gyroscope during turns is shown as circuit interrupter 56 which includes a centrifugal device 64 connected to rotate with the change-course shaft 65 of the automatic pilot with which worm 63 rotates. The circuit interrupter includes switches 66 which are normally biasing to closed position, but upon rotation of the shaft 65 by means of a handle or knob 67, the centrifugal masses 68 fly out and rotate the bell crank lever 69 temporarily to open the switches 66 during the turn. The circuit interrupter is also connected through conductors 70 to amplifier 71 which, in turn is connected to the opposed coils 72, 73 of a polarized relay 74, the polarizing winding being shown at 75. Winding 75 is shown as excited from the source of alternating current 50 through any suitable form of frequency doubler 176 for the reasons hereinbefore explained in connection with frequency doubler 30. Excitation of the relay in one phase sense will cause armature 76 to engage contact A and in the other phase sense contact B, these contacts being connected to the A. C. torque device 77 mounted on the vertical ring 78 of the gyro 79. The torque motor 77 may be of the character shown in our parent application above referred to, Serial No. 366,370 and may comprise, for example, three windings which are preferably mounted on vertical ring 80 and a squirrel cage rotor which is secured on the trunnion 81 which rotatably supports the rotor bearing case 82 of the gyro on the vertical ring. Two of the windings may be connected at one end thereof respectively to the contacts A and B of the relay 74 and the other ends thereof may be connected together and to one of the terminals of the three phase supply 50, the contacts A and B serving to connect these windings across one phase of the three-phase supply. The third winding may be connected directly across another phase of said supply so that the device operates as a two phase, reversible induction motor.

In this embodiment of our invention, the rudder servo is controlled by a relay 83 which, in turn, is controlled by a suitable pick-off 84 at the directional gyroscope. The servo motor, of course, may likewise be controlled in the manner illustrated in Fig. 1. The pick-off 84 is illustrated as of the well known inductive type comprising a three-fingered or E transformer 84a, mounted on the follow-up disc 85, and a movable core 86 secured to the shaft 87 which, in turn, is connected to rotate in azimuth with the vertical ring 80 of gyroscope 79. Disc 85 is shown as mounted on a shaft 88 which may be turned from the course change knob 67 through shaft 65, worm 89 and worm wheel 90 so that course changes may be simultaneously made in one operation on both the directional gyroscope and the flux valve. Gears 91 and 92, as shown, impart motion to the centrifugal device 64 when the course-change knob 67 is rotated.

In this embodiment, a simple or one-way connection may be employed between the flux valve 47 and the gyroscope 79 since the follow-back connection, in this instance, is furnished by the air craft itself, the heading of which is automatically controlled from the gyroscope 79.

The operation of the modification of our invention shown in Fig. 3 briefly is as follows. Assuming that the flux valve 48 lies in the position in which it provides zero signal voltage output, the gyroscope 79 providing a directional reference, if the pick-off 84 supplies no signal to relay 83, the heading of the craft will not be in error and no actuation of the control surface or rudder of the craft will take place. Upon change of course due to actuation of the knob 67, causing relative movement between the armature and core of the pick-off 84, a signal will be supplied to relay 83, causing the servo motor to actuate the control surface in a direction to place the craft on a new heading. Simultaneously with relative angular movement of the parts of the pick-off, by the knob 67, the flux valve 47 will be rotated in azimuth through a similar angular extent, and the craft, when it moves through the same angle to follow its new heading, will carry the flux valve therewith and back to a zero voltage output position. Should the gyro wander, such movement thereof will provide a signal voltage output from pick-off 84 causing the craft to follow a heading corresponding to the change in the reference caused by the wandering of the gyro. Such change in heading of the craft will move the flux valve to a position wherein a signal voltage will be supplied to the amplifier and its associated relay 74, thereby causing a precessing torque to be applied to the gyro in such a direction as to move the gyro in azimuth back to the position from which it has wandered. The craft, of course, will follow the precessing movements of the gyro and will thereby be returned to its original correct heading.

While in the drawings we have shown the flux valve as mounted independently of and remote from the directional gyroscope, the flux valve may, if desired, be mounted directly on the gyroscope and stabilized thereby. In this event, we prefer to mount the flux valve on the rotor bearing case 82 of the gyroscope so that the flux valve will be stabilized at least about the horizontal trunnion 81 and, preferably, these trunnions normally extend in a north-south direction so that the vertical axis of the flux valve is not tilted out of the vertical plane containing said axis.

In the modifications of our invention illustrated in Figs. 1 and 3, it will be observed that we have illustrated the preferable inclusion of circuit-interrupting means between the flux valve and the gyroscope. The purpose of a means of this character is to temporarily remove the flux valve control over the gyro-precessing means during turning movements of the valve and craft. In automatic pilots of the character contemplated in the present invention and as illustrated in Fig. 6, means are provided for controlling the rate of turn of the craft and for insuring a correct bank angle during such turns. If the turns under these conditions are of considerable duration, errors may creep in if the flux valve were connected in controlling relation to the gyro during such turns. Turning of the craft will cause the pendulously supported flux valve to swing out of the horizontal plane it normally occupies, thereby subjecting it in part to the vertical component of the earth's field and providing a spurious error signal output or a signal which is not solely due to disagreement between the directional references provided by the flux valve and gyroscope. Over an appreciable period of time or during turns of extended duration, this spurious error signal would cause the gyro to precess, thereby changing the signal output of the pick-off at the gyro, which change would disturb the signal equilibrium existing in the control circuits of the automatic pilot during turns and while the craft is turning at the correct prescribed rate and corresponding bank angle as hereinafter pointed out. Therefore, we prefer to remove the control of the flux valve over the gyro during such turning movements. The following description of Fig. 6 will bring out more clearly the function of our preferred form of an automatic pilot in controlling the craft as described in the foregoing.

In the embodiment of our invention illustrated in Fig. 6, we have shown a pair of flux valves indicated generally at 93 and 94, respectively, which are adapted to be pivotally supported on the craft in spaced relation to each other and on opposite sides of the yaw axis as, for example, in opposite wing tips of the plane.

Ordinarily, in a straight line course of the craft, the pendulously supported flux valve would be maintained substantially in a horizontal plane. However, since they are pendulous, they are subject to acceleration or deceleration forces and may oscillate about the true vertical. If these oscillations are symmetrical and of a fairly short period, a directional gyro will act as an averaging or integrating device and its directional indication will remain accurate. When used in aircraft, it is desirable to place the flux valve remote from the gyroscope and from the cabin of the plane as in the wing tip in order to avoid magnetic interaction with instruments, controls, engine parts, and the armor of the fuselage if such is used. When the flux valve is pendulously supported in a wing tip it is subjected to various forms of acceleration forces. One force most seriously effecting the flux valve is that experienced while the ship is yawing since this type of acceleration has a fairly large period and its effect will not be averaged out. In yawing one wing of the craft accelerates to a position ahead of the other during one-half cycle and will then decelerate while the other wing accelerates.

However, by mounting a pendulously supported flux valve in one wing and another in the other wing, or on opposite sides of the yaw axis of the craft, both flux valves will be tilted outwardly during yaw resulting, for example, in a forward and left tilt for one and a rearward and right tilt for the other. In other words, the angular tilt of each flux valve will be approximately equal and opposite to that of the other one. As a result, for a reasonably small amplitude of oscillation, any spurious error or change in signal of one flux valve will be compensated for by a similar error in the other one so that average instantaneous combining of the signals of the two flux valves will provide a more accurate indication of the true magnetic bearing.

Therefore, in Fig. 6, we have shown two pendulously supported flux valves which are adapted to be mounted on a craft on opposite sides of the yaw axis thereof or in opposite wing tips of a plane, the exciting windings thereof being energized from the alternating source 29. The flux valves may be of the character illustrated in Fig. 1 with corresponding legs having like orientations in the earth's field, the outputs of the pick-up windings of corresponding legs being connected together by conductors 95 in such a manner that the respective voltage outputs are added together for normal flux valve operation. However, the spurious error outputs will oppose each other for the reasons advanced in the above. The arrangement of the flux valves as described will also compensate at least in part for the effect thereon of distortion of the magnetic field in the vicinity of the craft because of the large masses of iron or other magnetic materials in or around the fuselage. The effect of these magnetic masses is to produce static deviation errors which are at least partly balanced out by the use of two flux valves arranged in the manner above described.

The flux valves are connected from the cross-connecting conductors 95 through conductors 96 to the signal transformer 17 which is associated with the directional gyro 26 as hereinabove described in connection with Fig. 1. In this embodiment of our invention we have not included the circuit-interrupting means hereinbefore described, but it is to be understood that such means may be included as disclosed in Fig. 1. The illustration in Fig. 6 of the gyroscope 26 and its associated control elements and pick-off are similar in all respects to that shown in Fig. 1 and a detailed description thereof at this point is deemed unnecessary save to point out that the gyroscope shown in Fig. 6 is provided with a vertical reading compass card 97 driven from the vertical ring 98 of the gyro through bevel gears 99 and 100. The precessing coils 27 and 28 are as hereinbefore described in connection with Fig. 1, and permanent magnets 101 fastened to the rotor bearing case cooperate therewith in producing a torque to cause precession of the gyro about its vertical or azimuth axis.

In Fig. 6, the output of the pick-off 31 is supplied to the signal generator 35 as hereinbefore described and the output of the signal generator is supplied as the phase-sensitive servo amplifiers 38, the output of which actuates torque motor 40. In the illustration of the present embodiment of the invention, we have shown a servo motor of the hydraulic type, the armature 102 of the torque motor serves to actuate the rocker arm 103 of a pilot valve which controls the operation of the servo. When using a hydraulic servo, we prefer to use one in which the aerodynamic forces acting on the control surface or rudder 43 will react through the connections between the rudder and servo and through the fluid of the system as a repeat back to the pilot valve, whereby displacement of the control surface will be measured against the magnitude of the control signal supplied to the servo amplifier.

In Fig. 6, we have illustrated a suitable form of mechanism for effecting a rate of turn control over the craft. The polyphase winding of the signal generator 35 may be displaced relative to the single phase winding thereof by means of course-setting knob 44 as hereinbefore described in connection with Fig. 1. For rate of turn control purposes, the single phase winding 36 of generator 35 may be angularly displaced relative to the polyphase winding thereof at a desired rate. For this purpose, we have shown a constant speed motor 104 which drives through a suitable worm 105 and meshing worm wheel 106, worm 107 and meshing worm wheel 108, to the disc 109 of a variable speed transmission. A ball carriage 110 is interposed in frictional engagement with the disc 109 and cylinder 110 and the position of the ball carriage measured radially of the disc 109 will determine the rate of the output of the variable speed transmission or the rate at which worm 46 is rotated. A turn control knob 112 serves through the medium of bevel gears 113, shaft 114, gear 115 and rack 116 on which the ball carriage is mounted to control the radial position of the ball carriage and the rate at which angular displacement between the single phase winding 36 and the polyphase winding 34 of the signal generator 35 occurs.

With the arrangement shown in Fig. 6, the degree and direction of angular displacement of the turn control knob 112 will control the rate and the phase sense of change of signal output from the signal generator 35, and the automatic pilot will actuate the control surface of the craft to initiate a rate of turn of the craft corresponding to the rate of turn set in by the turn control knob 112 or until the rate signal derived from the signal generator 35 is substantially matched by a similar signal supplied from the pick-off 31. The signal from 31, of course, will be dependent upon the rate of turn of the craft since the single phase winding 33 of the pick-off will remain stationary in space with the vertical ring of the gyro and the polyphase winding 32 thereof will rotate with the craft in azimuth.

Turn control knob 112 may also operate to control a potentiometer 117 or other suitable signal generator which serves to supply a signal for aileron control purposes, the signal being supplied through a suitable amplifier in controlling relation to a servo which operates the ailerons of the craft as shown. Hence, a control over both the rudder and ailerons may be exercised for turning the craft at a desired rate of turn. The rudder initiates the turn and thereafter may assume a neutral position while the craft is turning at the prescribed rate. Under these latter conditions, the signal supplied to the rudder servo amplifier is substantially reduced to zero through the operations of pick-off 31 and signal generator 35. Hence, as hereinbefore described, during turns, precession of the gyro due to spurious error voltage outputs of the flux valve or valves is not desirable since such operation would change the output of the pick-off 31, thereby affecting an otherwise correct attitude and bank of the craft while turning at the prescribed rate.

Since many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. An automatic pilot for positioning a control surface of a craft comprising a flux valve adapted to provide a signal output varying with changes in azimuthal position of said valve, a directional gyro movable in azimuth relative to said valve, means for precessing said gyro about its azimuth axis, electrical means controlled by said flux valve for controlling said precessing means and including a signal responsive means for receiving the output from said flux valve and means for compensating for any change in the received output from said valve when azimuthal rotation only of said valve occurs, and means responsive to the azimuthal position of said gyro for controlling the position of said control surface.

2. An automatic pilot for positioning a control surface of a craft comprising a flux valve, a directional gyro movable in azimuth relative to said valve, means for precessing said gyro about its azimuth axis, electrical means controlled by said flux valve for controlling said precessing means and including a pair of electrically cooperable, relatively movable elements, one of said elements being movable in azimuth with said flux valve and the position of the other element being controlled by said gyro to correspond with the azimuth position of said gyro, and one thereof being responsive to the signal output of said valve and the other being operable to supply a voltage output and thereby effect an operation of said gyro precessing means when the electrical relationship of said elements varies from a predetermined one providing substantially zero voltage output, a servomotor for positioning said control surface, pick-off means at said gyro, and means responsive to the signal output of said pick-off means for controlling said servomotor.

3. An automatic pilot for positioning a control surface of a craft comprising a flux valve, a directional gyro, means for precessing said gyro about its azimuth axis, control means for said precessing means including a self-synchronous transformer having two relatively movable windings, a first of said windings being connected to receive the output from said flux valve and one being fixed against azimuthal rotation relative to said flux valve and the other winding being movable relative thereto with azimuthal rotation of said gyro whereby a control signal is generated in a second of said windings when a departure of said gyro from a predetermined azimuthal position occurs, a servomotor for actuating said control surface, pick-off means at said gyro, and means responsive to the signal output of said pick-off means for controlling said servomotor.

4. An automatic pilot for positioning a control surface of a craft comprising a flux valve adapted to provide a signal output varying with changes in azimuthal position of said valve, a directional gyro movable in azimuth relative to said valve, means for precessing said gyro about its azimuth axis, electrical means controlled by said flux valve for controlling said precessing means and including a signal responsive means for receiving the output from said flux valve and means for compensating for any change in the received output from said valve when azimuthal rotation only of said valve occurs, a servomotor for actuating said control surface, pick-off means at said gyro for providing a signal output when the heading of said craft and the directional reference provided by said gyro changes, means responsive to the signal provided by said pick-off for controlling said servo, and means for further controlling the pick-off signal supplied to said last-mentioned means.

5. An automatic pilot for positioning a control surface of a craft comprising a flux valve adapted to provide a signal output varying with changes in azimuthal position of said valve, a directional gyro movable in azimuth relative to said valve, means for precessing said gyro about its azimuth axis, electrical means controlled by said flux valve for controlling said precessing means and including a signal responsive means for receiving the output from said flux valve and means for compensating for any change in the received output from said valve when azimuthal rotation only of said valve occurs, a servomotor for actuating said control surface, means controlled by the position of said gyro including course-setting means for controlling said servo in accordance with the directional reference provided by said gyro and said course setting means.

6. An automatic pilot for positioning a control surface of a craft comprising a flux valve, a directional gyro, means for precessing said gyro about its azimuth axis, control means for said precessing means including a self-synchronous transformer having two relatively movable windings, a first of said windings being connected to receive the output from said flux valve and one being fixed against azimuthal rotation relative to said flux valve and the other winding being movable relative thereto with azimuthal rotation of said gyro whereby a control signal is generated in a second of said windings when a departure of said gyro from a predetermined azimuthal position occurs, a servomotor for actuating said control surface, and electrical means associated with said gyro and servo including course-setting means for controlling said servo in accordance with the directional reference provided by said gyro and said course-setting means.

7. An automatic pilot for positioning a control surface of a craft comprising a flux valve adapted to provide a signal output varying with changes in azimuthal position of said valve, a directional gyro, means for precessing said gyro in azimuth, electrical means controlled by said flux valve for controlling said precessing means including a signal responsive means for receiving the output from said flux valve and means for compensating for any change in the received output from said valve when azimuthal rotation only of said valve occurs, a servomotor for positioning said control surface, a first signal-providing means actuated by said gyro when relative azimuthal movement of said gyro and craft occurs for supplying a signal to control said servo, a second signal-providing means for supplying a servo-controlling signal proportional to a desired rate of turn of said craft, said first and second signal-providing means being so constructed and arranged that zero signal is supplied when the desired rate and actual rate of turn of the craft are equal, and means for removing the control of said flux valve over said gyro-precessing means during turning movements of the craft.

8. An automatic pilot of the character recited in claim 7 in which the flux valve is pendulously supported.

9. In an automatic pilot of the gyro-magnetic type for positioning the rudder of a craft, a magnetic device for providing an azimuth reference through interaction with the earth's magnetic field, a directional gyro, means for precessing said gyro in azimuth, electrical means for controlling said precessing means including means responsive to change in position in azimuth of said directional gyroscope with respect to the earth's magnetic field as determined by said magnetic device, a servo motor for positioning said rudder, a first signal-providing means actuated by said gyro when relative azimuthal movement of said gyro and craft occurs, and a second signal-providing means for supplying a signal proportional to a desired rate of turn of the craft, said two signal-providing means being so constructed and arranged that a zero signal is supplied to control said servo motor when the desired rate of turn and the actual rate of turn of the craft are equal.

10. In an automatic pilot of the gyro-magnetic type for positioning the rudder of a craft, a magnetic device for providing an azimuth reference through interaction with the earth's magnetic field, a directional gyro, means for precessing said gyro in azimuth, electrical means for controlling said precessing means including means responsive to change in position in azimuth of said directional gyroscope with respect to the earth's magnetic field as determined by said magnetic device, a servomotor for positioning said rudder, a first signal-providing means actuated by said gyro when relative azimuthal movement of said gyro and craft occurs, a second signal-providing means for supplying a signal proportional to a desired rate of turn of the craft, said two signal-providing means being so constructed and arranged that a zero signal is supplied to control said servomotor when the desired rate and the actual turn of the craft are equal, and means for removing the control of said magnetic device over said gyro precessing means during turns of the craft.

11. An automatic pilot for positioning a control surface of a craft comprising a flux valve adapted to provide a signal output varying with changes in azimuthal position of said valve, a directional gyro, means for precessing said gyro in azimuth, electrical means controlled by said flux valve for controlling said precessing means including a signal responsive means for receiving the output from said flux valve and means for compensating for any change in the received output from said valve when azimuthal rotation only of said valve occurs, a servomotor for positioning said control surface, a first signal-providing means actuated by said gyro when relative azimuthal movement of said gyro and craft occurs for supplying a signal to control said servo, and a second signal-providing means for supplying a servo-controlling signal proportional to a desired rate of turn of said craft, said first and second signal-providing means being so constructed and arranged that zero signal is supplied when the desired rate and actual rate of turn of the craft are equal.

12. In an automatic pilot of the gyro-magnetic type for positioning a control surface of a craft for controlling azimuthal movements of said craft, a magnetic device for providing an azimuth reference through interaction with the earth's magnetic field, a directional gyro, means for precessing said gyro in azimuth, electrical means for controlling said precessing means including means responsive to change in position in azimuth of said directional gyroscope with respect to the earth's magnetic field as determined by said magnetic device, a servomotor for positioning said control surface, a first signal-providing means actuated by said gyro when relative azimuthal movement of said gyro and craft occurs, and a second signal-providing means for supplying a signal proportional to a desired rate of turn of the craft, said two signal-providing means being so constructed and arranged that a zero signal is supplied to control said servo motor when the desired rate of turn and the actual rate of turn of the craft are equal.

13. An automatic pilot for positioning the rudder of a craft, comprising an inductive device having a multipolar stator winding, and a rotor having a winding, a directional gyroscope connected to orient said rotor, a source of single phase current, a magnetic device adapted to provide an azimuth reference through interaction with the earth's magnetic field and including a stationary multipolar winding electrically connected to the multipolar winding of said inductive device and a stationary winding electrically connected to said source, a winding for applying a torque about the horizontal axis of said directional gyroscope, a phase-sensitive controller electrically connected to said rotor winding for supplying reversible D. C. to energize said torque winding only upon departure of the directional gyroscope from its predetermined orientation in the earth's field, means for generating a signal upon change of heading of the craft with respect to said directional gyroscope and a servomotor controlled by said signal for turning said rudder to restore the craft to its original heading.

14. An automatic pilot for positioning the rudder of a craft, comprising a signal transformer having a polycircuit stator winding and a rotor winding, a magnetic device for providing an azimuth reference through interaction with the earth's magnetic field and including an exciting winding and a polycircuit winding for providing an output varying with variations in the position of the earth's field relative thereto, the polycircuit windings of said device and transformer being connected together in polycircuit fashion whereby the direction of the resultant field in said transformer depends upon the direction of the earth's field relative to said magnetic device, a directional gyroscope connected to orient said rotor winding, a winding for slaving said directional gyroscope, a phase-sensitive controller controlled by the output of said rotor winding to energize said slaving winding, a transmitter oriented by said gyroscope and a servomotor connected to said rudder and controlled from said transmitter.

ORLAND E. ESVAL.
CARL A. FRISCHE.

REFERENCES CITED

The following references are of record in the file of this patent:

UNITED STATES PATENTS

| Number | Name | Date |
| --- | --- | --- |
| 1,863,415 | Rieber | June 14, 1932 |
| 1,958,259 | Becker | May 8, 1934 |
| 2,115,498 | Rieper | Apr. 26, 1938 |
| 2,126,855 | Wunsch et al. | Aug. 16, 1938 |
| 2,177,242 | Carlson | Oct. 24, 1939 |
| 2,308,566 | Noxon | Jan. 19, 1943 |
| 2,313,682 | Stuart | Mar. 9, 1943 |